Patented July 23, 1946

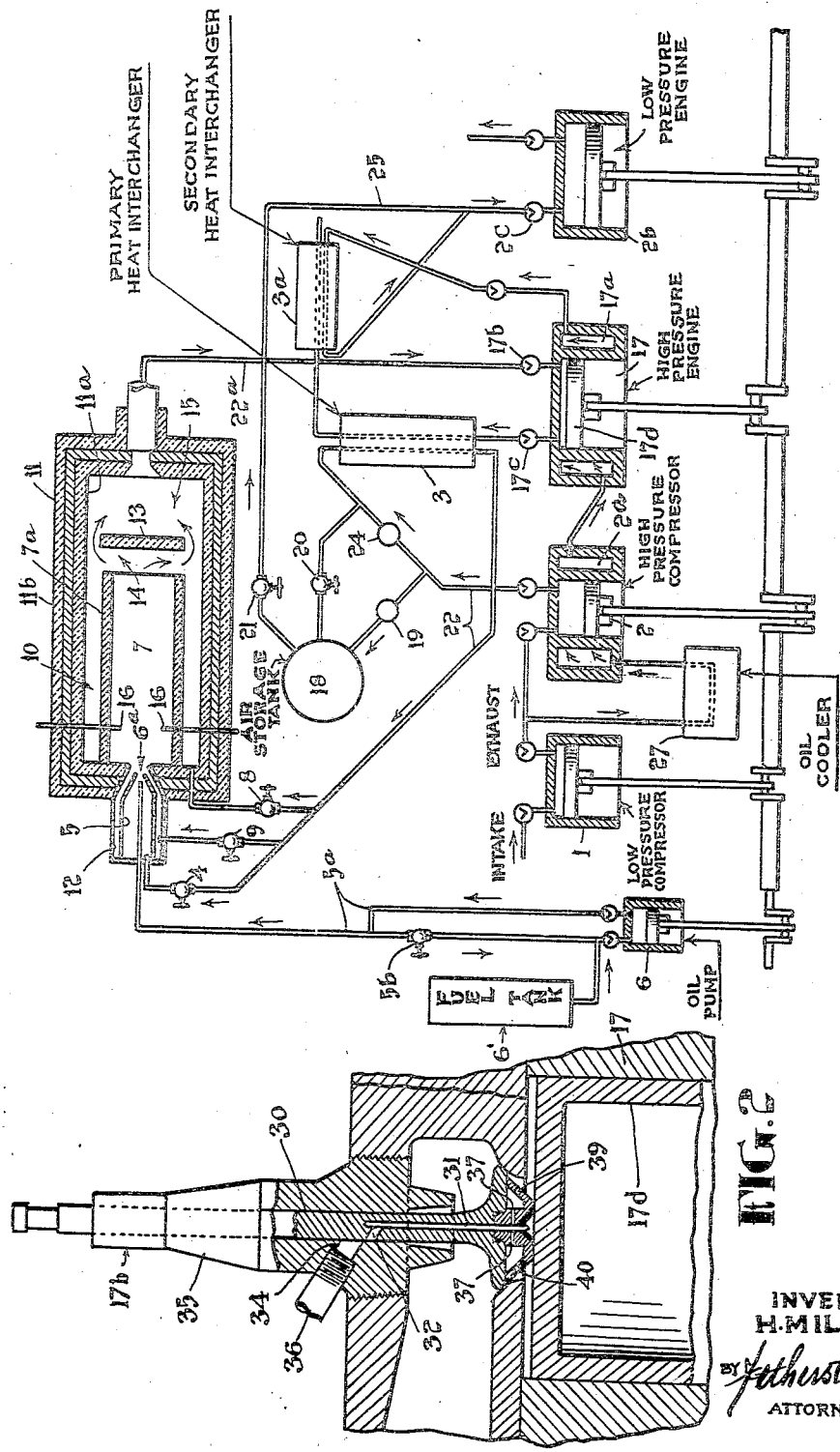

2,404,395

UNITED STATES PATENT OFFICE 2,404,395

APPARATUS FOR CONVERTING HEAT ENERGY INTO USEFUL WORK

Humphreys Milliken, Mount Royal, Quebec, Canada

Application December 14, 1942, Serial No. 469,027

4 Claims. (Cl. 60—49)

This invention relates to the conversion of heat energy into useful work and the main purpose is to provide means whereby a higher thermal efficiency is attained in connection with the operation of prime movers in which a gaseous medium expanded by heat is used as the motive fluid.

Other purposes, advantages and characteristic features of the invention will be more readily understood from the following detailed description of the accompanying drawing, in which—

Fig. 1 is a diagrammatic view of one form of apparatus by which the invention may be reduced to practice.

Fig. 2 is a sectional view showing the preferred construction of the inlet valve of a high pressure engine forming part of the apparatus shown in Fig. 1.

As shown in Fig. 1, a low-pressure compressor 1 takes air from the atmosphere, compresses it to a relatively low pressure (such as 6 pounds per square inch above atmosphere). About 90% of this low-pressure air is used for cooling purposes as hereinafter described. A small percentage of this low-pressure air (such as ten percent) is drawn into a high-pressure compressor 2 which compresses the air to a relatively high pressure (such as 209 pounds per square inch absolute). This high-pressure air passes through a heat-exchanger 3 absorbing heat from the exhaust pipe of the engine, increasing in volume, passing through a hand-operated valve 4 into a burner 5, where the air mixes with fuel-oil supplied continuously by pump 6, and burns continuously in combustion chamber 7. Valve 4 is adjusted to supply air in the correct ratio for combustion (approximately 15 lbs. of air per pound of fuel oil). Valves 8 and 9 are adjusted to conjointly supply excess air of such amount that the ratio of fuel to total air is approximately 41 percent of the quantity of fuel which could be burned by admixture with that quantity of air. The combustion chamber 7 has walls 7a of fire-resisting material such as firebrick or soapstone. A metal cylinder 11 surrounds the fire-resisting walls, with a space or jacket 10, through which passes the excess air entering through valve 8. The excess air absorbs heat from the fire-resisting walls, increasing in temperature and volume as it passes through the jacket. The air supplied through valve 9 enters the combustion chamber through a small jacket 12 and serves to shield the burner tip 6a from the radiant heat of the flame in the combustion chamber and to prevent over- heating of liquid oil in the tip which might carbonize the oil and clog the small aperture in the tip. The air entering the combustion chamber through jacket 12 also serves to prevent the walls 7a of the combustion chamber being overheated by the stream of burning products issuing from the burner 5. The proportion of air supplied through valve 9 is not sufficient to interfere with complete combustion of the fuel. A baffle 13 of fire-resisting material deflects the combustion products exhausting through opening 14, meeting the excess air supplied through valve 8 and mixing thoroughly in the mixing chamber 15, thence passing to the high-pressure engine 17.

Ignition of the fuel-air mixture at the outlet of the burner 5 is accomplished by a pair of electrodes 16 which are drawn apart and out of the flame after the ignition. Thereafter combustion is maintained continuously by the heat of the flame with a continuous flow of fuel oil and compressed air into the furnace. The combustion does not raise the pressure, which is maintained approximately constant at 209 lbs. absolute per square inch. The combustion increases the temperature of the air and the volume increases in proportion to the increase in the absolute temperature.

The metal drum 11 of the pressure furnace is lined internally with heat-insulation 11a to protect the metal from overheating and is heat-insulated externally as indicated at 11b to minimize loss of heat energy. All piping conveying air or gas is likewise insulated internally and externally.

The high-pressure engine 17 has inlet and exhaust valves 17b and 17c which open and close in the same sequence as the valves of a steam engine. The inlet or "admission" valve 17b opens at or near "top dead-center" of piston 17d, remains open supplying pressure-gas at the constant pressure of 209 lbs. until the piston has moved 20 percent of its working stroke, then the admission valve closes and the gases expand down to a pressure of about 21 lbs. absolute (assuming 14.7 atmospheric pressure) at or near the "bottom dead-center" or end of working stroke, when the exhaust valve opens.

Under normal operating conditions, the temperature of the exhaust will be about 900° F. above the temperature of the compressed air leaving the high-pressure compressor. The exhaust is passed through the heat-exchanger 3 transferring heat to the compressed air and increasing the volume of the air.

Under normal operating conditions, the temperature of the compressed air leaving the high-pressure compressor will be about 1220° F. absolute and the temperature of the air and gases entering the high-pressure engine will be about 4200° F. absolute. Although these temperatures are lower than those in internal combustion engines, still some cooling of the cylinders will be required to prevent overheating the metal and lubricating oil in the cylinders. In compressors and engines heretofore used such cooling is done without any means of utilizing the heat taken from the cylinders to produce motive power.

In this invention, such heat is utilized for motive power by the following means: Compressor cylinder 2 and engine cylinder 17 have cooling jackets as shown at 2a and 17a. The compressor 1 pumps air through these jackets at a pressure of about 6 lbs. per square inch above atmosphere, the compressed air entering jacket 2a at about 120° F. and leaving jacket 17a at about 175° F. The quantity of low-pressure air (by weight) passing through the jackets being about nine times the quantity of air (and gases) passing through the high-pressure cylinders in a given time, and the density of the cooling air being about 33% greater than sea-level air, effective cooling can be accomplished by this means.

After passing through the cooling jackets of the high-pressure compressor and engine, absorbing heat and increasing in volume (at the constant pressure of 6 lbs.) the cooling air then passes through a heat-exchanger 3a, where it receives heat from the cooler end of the exhaust from the high-pressure engine. This exhaust has been cooled to about 1320° F. absolute in passing through heat-exchanger 3. The exhaust enters heat exchanger 3a at 1320° F., which is about 680 degrees above the low-pressure air, increasing its volume at constant pressure (the weight of the low-pressure air being about nine times the weight of the high-pressure air), after which the low-pressure air enters the low-pressure engine cylinder 2b and expands down to about 15.15 lbs. absolute, doing work which is added to the work of the high-pressure engine.

All of the heat energy received by the low-pressure compressor-engine combination would be otherwise wasted and therefore whatever power it develops is obviously a clear gain for the high-pressure and low-pressure combination.

In Fig. 1 is shown a storage tank 18 in which compressed air at 209 lbs. pressure is stored, by passage through non-return valve 19 from pipe 22, whenever the pressure in the tank drops below the pressure in the pipe by a predetermined amount which may be varied at will by the operator. Tank 18 is also connected through valve 20 to pipe 22 and through valve 21 to pipe 25. By operating the air supply valve 4 and a fuel feed regulating valve 5b associated with the fuel supply line 5a; the operator increases or decreases the flow of fuel and air to the burner 5, keeping the fuel-air ratio at one to fifteen, for complete combustion; the power output of the engine is thus varied at will. Normally the air-intakes to the two compressors is not throttled, but remain wide open, so that there is no reduction in "volumetric efficiency"; the compressors draw in the same weight of atmospheric air per stroke regardless of the rate of flow of fuel and output of engine.

When the operator shuts down the engine, storage tank 18 remains charged with air at about 209 lbs. per square inch, non-return valve 24 having closed when engine stops and air flow stopped through pipe 22, hand valves 20 and 21 remaining normally closed.

When it is desired to operate the apparatus described herein valve 21 is opened so that compressed air passes from storage tank 18 through line 25 to the inlet valve 2c of the low-pressure engine 2b. Valve 20 is also opened so that compressed air passes from storage tank 18 to the inlet valve 17b of engine 17 via line 22, furnace 11 and line 22a. The air supply valve 4 and the fuel feed regulating valve 5b are adjusted to deliver to the burner 5 a combustible mixture of air and fuel which is ignited by supplying current to the electrodes 16 which are initially positioned close together in the path of the combustion products issuing from the burner 5. After ignition of the fuel mixture has been accomplished the electrodes 16 are withdrawn from the flame and are deenergized. I have not considered it necessary to show any particular means for energizing and moving the electrodes 16 since such means forms no part of the invention claimed herein.

In connection with the fuel feeding regulating valve 5b, it is pointed out that this valve controls a by-pass connection through which, in the fully opened position of the valve, all the fuel delivered by the pressure side of fuel pump 6 is returned to the suction side of said pump or to the fuel supply tank 6'. When the valve 5b is fully closed all the fuel delivered by the suction side of the fuel pump passes through line 5a to the burner 5. Consequently, by regulating the degree of opening of valve 5b it is possible to vary the amount of fuel which reaches the burner 5 for admixture with the air supplied through air valve 4.

Alternatively, the operator may leave valve 21 closed; its purpose is to give additional starting torque to the engine by applying relatively high pressure to the large area of the low-pressure engine cylinder while it is standing still. Non-return valves 19 and 24 prevent the compressed air from the valves 20 and 21 from flowing backward and thus into the cylinders of the engine and compressors, thus opposing the starting torque.

Fig. 2 shows means for cooling the inlet valve 17b of the high-pressure engine which is the valve which is subjected to the maximum temperature in this power plant, although this temperature is only 3250° F. absolute as compared with the usual temperature of about 4500° F. absolute in the common type of internal combustion engine. Except as hereinafter noted, the inlet valve is of the usual design including a relatively long and slender stem 30 which is usually about .30" in diameter. According to the present invention stem 30 is provided with a bore 31 of very small diameter (about $\frac{1}{32}$") along its axis. This bore is provided, adjacent its upper end, with a side opening 32 which, in the open position of the valve, registers with a side opening 34 provided in the valve stem guide 35. Water is continuously pumped to opening 34 through pipe connection 36. When the valve is in its open position a fine stream of water passes into bore 31 through opening 32 and is quickly vaporized and superheated, the steam and vapors thus generated escaping through the open lower end of the bore into the engine cylinder and mixing with the pressure gases and air. When the inlet valve is closed aperture 32 moves out of registration with valve stem guide opening 34 so that the supply of water to bore 31 is discontinued during the expansion and exhaust stroke of the engine. The heat of evaporation being high (about 1000 B. t. u. per pound of water) a very small quantity of water will have a relatively great effect in cooling the valve. Furthermore, the cooling effect is concentrated on the exact spot where it is most needed, viz., the small valve-stem and valve disc. To assist in distributing the cooling effect throughout the valve disc, the disc carrying portion of the valve stem may be provided with a number of small passages 37 radiating from the bore 31, the steam passing through all of these radiating passages into the hollow interior of the valve disc 39 and from thence through openings 40 into the engine cylinder.

The inlet valve must open against the constant pressure of the gases. To assist the cam and mechanism in opening the valve against this pressure, the valve disc is extended into the working cylinders of engine 17 slightly (such as 1/8") so that the valve disc is moved about 1/16" by the engine piston 17d as its velocity approaches its minimum and comes to rest at the "top dead center" of its exhaust stroke. Lifting the valve disc 1/16" off of its seat admits pressure-gas to the cylinder thus equalizing the gas-pressure on both sides of the valve-disc, permitting the valve-gear and cam to easily move the valve to its full open position (about 3/8").

Fig. 1 shows the low-pressure compressor delivering air to 21 lb. absolute to the intake of the high-pressure compressor. This is not essential; the high-pressure compressor might take air from the atmosphere, as was assumed in the foregoing calculations of the performance. Fig. 1 shows an oil-cooler 27 for cooling the hot lubricating oil from the high-pressure engine and compressor by transferring heat to the low-pressure air. Fig. 1 also shows heat-exchanger 3a similar to 3, in which the exhaust from the high-pressure engine transfers heat to the low-pressure air without mixing with it.

It is obvious that turbines or rotary engines might be substituted for pistons and cylinders for the compression and expansion of the air and gases without departing from the principles of the invention.

What I claim is:

1. Apparatus of the character described comprising a high pressure prime mover in which gas, which has been compressed to a relatively high pressure and heated externally of the prime mover, is expanded to produce power, a high pressure compressor for compressing the gas which is used as the motive agent in said prime mover, said compressor and prime mover being provided with cooling jackets, an auxiliary compressor for compressing air to a temperature and pressure lower than the temperature and pressure of the compressed gas delivered by the main compressor to said prime mover, means for passing compressed air from the auxiliary compressor through said cooling jackets and means whereby the compressed air delivered by said auxiliary compressor is expanded in the performance of useful work after passing through said jackets.

2. Apparatus as set forth in claim 1 including means whereby heat is transferred from the expanded gas discharged by the high pressure prime mover to the compressed air delivered by the auxiliary compressor after the last mentioned compressed air is passed through said jackets but before it has been expanded in the performance of useful work.

3. Apparatus as set forth in claim 1 in which the last mentioned means comprises a low pressure prime mover and in which means are provided to enable the low pressure prime mover to be used as a starting motor for said apparatus.

4. Apparatus of the character described comprising a low-pressure compressor, a high-pressure compressor of the reciprocating piston type provided with a cooling jacket, an air heater, a high-pressure engine of the reciprocating type provided with a cooling jacket, a low-pressure engine, primary and secondary heat interchangers, means for passing a portion of the compressed air delivered by the low-pressure compressor to the working cylinder of the high-pressure compressor, means for passing another portion of the compressed air delivered by the low-pressure compressor through the cooling jacket of the high-pressure compressor and thence through the cooling jacket of the high-pressure engine and the secondary heat interchanger to the working cylinder of the low-pressure engine, means for passing the compressed air delivered by the high-pressure compressor through the primary heat interchanger and thence through the air heater to the working cylinder of the high-pressure engine, and means for passing the exhaust from the high-pressure engine through the primary heat interchanger and then through the secondary heat interchanger.

HUMPHREYS MILLIKEN.